United States Patent
Kim et al.

(10) Patent No.: US 10,289,601 B1
(45) Date of Patent: May 14, 2019

(54) HOST CONTROLLER, SECURE ELEMENT AND SERIAL PERIPHERAL INTERFACE COMMUNICATIONS SYSTEM

(71) Applicant: SAMSUNG ELECTRONICS CO., LTD., Suwon-si (KR)

(72) Inventors: Young-seok Kim, Gwangju-si (KR); Seok-Hyun Kim, Hwaseong-si (KR); Tae Seon Kim, Hwaseong-si (KR); Min-Woo Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/018,334

(22) Filed: Jun. 26, 2018

(30) Foreign Application Priority Data

Dec. 21, 2017 (KR) .................. 10-2017-0176746

(51) Int. Cl.
*G06F 13/42* (2006.01)
*G06F 13/364* (2006.01)
*H04L 7/00* (2006.01)
*H04L 12/403* (2006.01)

(52) U.S. Cl.
CPC ........ *G06F 13/4291* (2013.01); *G06F 13/364* (2013.01); *H04L 7/0008* (2013.01); *H04L 12/403* (2013.01)

(58) Field of Classification Search
None
See application file for complete search history.

(56) References Cited

U.S. PATENT DOCUMENTS

| | | | |
|---|---|---|---|
| 9,179,301 B2 | 11/2015 | Huque et al. | |
| 9,224,013 B2 * | 12/2015 | Buer | G06F 21/76 |
| 9,299,072 B2 | 3/2016 | Khan et al. | |
| 9,319,088 B2 | 4/2016 | Ballesteros et al. | |
| 9,325,383 B2 | 4/2016 | Ballesteros | |
| 9,661,448 B2 | 5/2017 | Charles | |
| 2009/0013056 A1 * | 1/2009 | Weinstock | G06F 3/1462 |
| | | | 709/208 |
| 2010/0011128 A1 * | 1/2010 | Paycher | G06F 13/102 |
| | | | 710/1 |
| 2013/0336426 A1 * | 12/2013 | Tudosie | G06K 19/072 |
| | | | 375/316 |

(Continued)

FOREIGN PATENT DOCUMENTS

KR 10-2017-0020137 A 2/2017

*Primary Examiner* — Michael Sun
(74) *Attorney, Agent, or Firm* — Sughrue Mion, PLLC

(57) ABSTRACT

A host controller, a secure element, and a serial peripheral interface communications system are provided. The host controller is configured to connect to a secure element via a serial peripheral interface and includes: a resume signal generator configured to generate a first resume signal indicating a start of communication with the secure element; a transmitter configured to transmit the first resume signal to the secure element; a slave select line activator configured to activate a slave select line after the first resume signal is transmitted; and a clock controller configured to transmit a first clock signal to the secure element over a clock line based on the slave select line being activated, and the transmitter is further configured to transmit a first signal containing first data to the secure element over a master-out slave-in line (an MOSI line) while the first clock signal is being transmitted.

20 Claims, 10 Drawing Sheets

(56) References Cited

U.S. PATENT DOCUMENTS

| | | | | |
|---|---|---|---|---|
| 2014/0380403 A1* | 12/2014 | Pearson | ............... | G06F 21/60 726/1 |
| 2015/0293864 A1* | 10/2015 | Hill | ............... | G06F 13/22 710/109 |
| 2018/0225230 A1* | 8/2018 | Litichever | ............... | G06F 21/56 |
| 2018/0364911 A1* | 12/2018 | Gupta | ............... | G06F 3/0604 |

* cited by examiner

HOST CONTROLLER, SECURE ELEMENT AND SERIAL PERIPHERAL INTERFACE COMMUNICATIONS SYSTEM

This application claims priority from Korean Patent Application No. 10-2017-0176746, filed on Dec. 21, 2017 in the Korean Intellectual Property Office, the disclosure of which is incorporated herein by reference in its entirety.

BACKGROUND

1. Field

Methods and apparatuses consistent with example embodiments relate to a host controller, a secure element, and a serial peripheral interface communications system.

2. Related Art

A secure element is a storage medium in which information to be secured and applets that use the information are securely stored. The secure element may include a Subscriber Identity Module/Universal Integrated Circuit Card (SIM/UICC), an embedded Secure Element (eSE), a micro Secure Digital (SD) card, etc.

A computing device equipped with a secure element typically uses a single-wire protocol as a data communications interface between an eSE and a host controller, such as a near field communication (NFC) module. Unfortunately, such a single-wire protocol interface has a limited maximum transmission rate of 1.696 megabits per second (Mbps). However, a higher transmission rate is required. Therefore, research is ongoing to develop a method for communicating between a secure element and a host controller via an interface suitable for a service requiring a high speed.

SUMMARY

Example embodiments provide an interface having a high transmission rate between a secure element and a host controller.

This and other aspects, embodiments and advantages will become apparent to those of ordinary skill in the art.

According to an aspect of an example embodiment, there is provided a host controller configured to connect to a secure element via a serial peripheral interface, the host controller including: a resume signal generator configured to generate a first resume signal indicating a start of communication with the secure element; a transmitter configured to transmit the first resume signal to the secure element; a slave select line activator configured to activate a slave select line after the first resume signal is transmitted; and a clock controller configured to transmit a first clock signal to the secure element over a clock line based on the slave select line being activated, and the transmitter being further configured to transmit a first signal containing first data to the secure element over a master-out slave-in line (an MOSI line) while the first clock signal is being transmitted.

According to an aspect of another example embodiment, there is provided a secure element configured to connect to a host controller via a serial peripheral interface, the secure element including: a resume signal generator configured to generate a first resume signal indicating a start of communication with the host controller; and a transmitter configured to transmit the first resume signal to the host controller, and a first signal containing first data to the host controller over a master-in slave-out line (an MISO line) while a slave select line is activated and a first clock signal is received over a clock line.

According to an aspect of yet another example embodiment, there is provided a serial peripheral interface communication system including a secure element; and a host controller connected to the secure element via a serial peripheral interface. The host controller includes a first resume signal generator configured to generate a first resume signal indicating a start of communication between the secure element and the host controller, and the secure element includes a second resume signal generator configured to generate, before second data is transmitted to the host controller, a second resume signal indicating the start of communication between the secure element and the host controller.

BRIEF DESCRIPTION OF THE DRAWINGS

The above and other aspects and features will become more apparent by describing in detail example embodiments thereof with reference to the attached drawings, in which.

DETAILED DESCRIPTION

Hereinafter, example embodiments will be described in detail with reference to the accompanying drawings.

Figure 1:
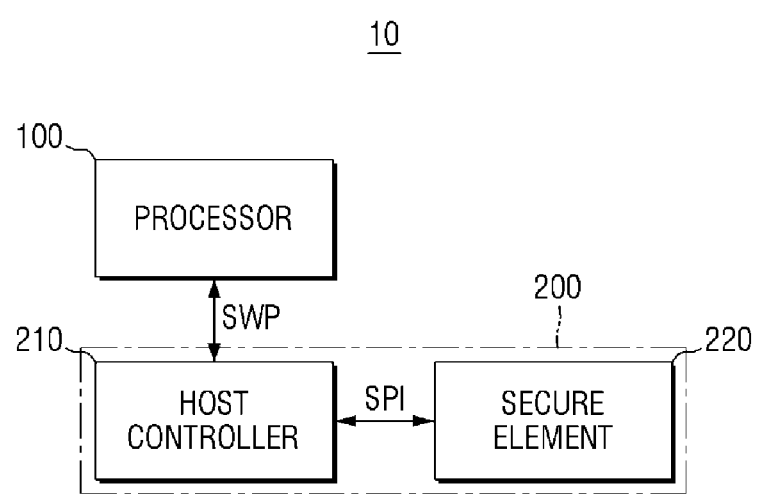
FIG. 1 is a diagram illustrating an example of a computing device including a serial peripheral interface communication system according to some example embodiments.

FIG. 1 is a diagram illustrating an example of a computing device including a serial peripheral interface communication system according to some example embodiments.

According to some example embodiments, a computing device 10 may include a processor 100, and a serial peripheral interface communication system 200. It is to be noted that additional elements may be added to the computing device 10 or some of the listed elements may be eliminated therefrom.

The computing device 10 may be implemented as one of a television (TV), a digital TV (DTV), an internet protocol TV (IPTV), a personal computer (PC), a desktop computer, a lap-top computer, a computer workstation, a tablet PC, a video game platform (or a video game console), a server, and a mobile computing device. The mobile computing device may be implemented as one of a mobile phone, a smart phone, an enterprise digital assistant (EDA), a digital still camera, a digital video camera, a personal navigation device or a portable navigation device (PND), a mobile internet device (MID), a wearable computer, an internet of things (IoT) device, an internet of everything (IoE), and an e-book.

The processor 100 may be configured to control the overall operation of the computing device 10. The processor 100 may also perform various operations performed on the computing device 10 and process data. The processor 100 may run an operating system (OS) for driving the computing device 10, an application, and a database manager.

The processor 100 may be a central processing unit (CPU), a co-processor, an arithmetic processing unit (APU), a graphic processing unit (GPU), a digital signal processor (DSP), an application processor (AP), or a communication processor (CP).

The serial peripheral interface communication system 200 may include a host controller 210 and a secure element 220.

The host controller 210 may manage a network between the host processor 100 and the secure element 220. For example, the host controller 210 may be an NFC module.

The processor 100 may store data in the secure element 220 via the host controller 210. In addition, the processor 100 may receive data stored in the secure element 220 via the host controller 210.

The processor 100 and the host controller 210 may transmit/receive data therebetween via an Inter-Integrated Circuit (I2C) interface. It is, however, to be understood that this is merely illustrative. Data may be transmitted and received between the processor 100 and the host controller 210 via serial peripheral interface (SPI) communication.

The secure element 220 may be a storage medium in which information to be secured and applets that use the information are safely stored. For example, the secure element 220 may include a SIM/UICC, an eSE, a micro SD card, etc.

The host controller 210 and the secure element 220 may transmit/receive data via serial peripheral interface (SPI) communication.

Data communication between a host controller 210 and a secure element 220 via a single-wire protocol interface is carried out by using a signal wire to transmit and receive data. For example, the host controller 210 may transmit a voltage signal to the secure element 220. In addition, the secure element 220 may transmit a current signal to the host controller 210. In this case, because the secure element 220 uses the current signal when it transmits data to the host controller 210, the transmission speed becomes very slow. Therefore, it is not suitable to use the single-wire protocol interface communication when transmitting/receiving a large amount of data.

Thus, according to some example embodiments, serial peripheral interface communication may be used to transmit and receive data between the host controller 210 and the secure element 220. The communication speed between the host controller 210 and the secure element 220 can be increased by using the serial peripheral interface communication.

Figure 2:
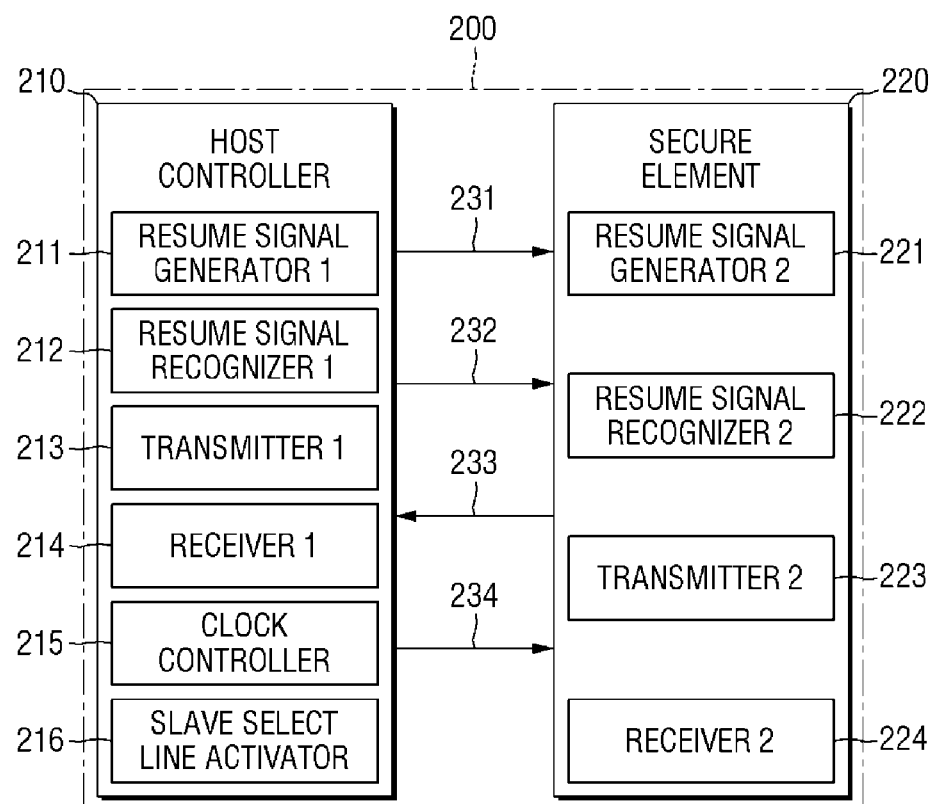
FIG. 2 is a block diagram illustrating the serial peripheral interface communication system according to some example embodiments.

FIG. 2 is a block diagram illustrating a serial peripheral interface communication system according to some example embodiments.

The serial peripheral interface communication system 200 may include the host controller 210 and the secure element 220. The host controller 210, for example, an NFC module may serve to manage a network. The secure element 220, for example, an eSE may serve as a storage medium in which information to be secured and applets that use the information are safely stored.

The host controller 210 and the secure element 220 may transmit and receive signals, such as data and clock signals, via serial peripheral interface communication.

For example, the host controller 210 and the secure element 220 may be connected to each other via a slave select line (SS line) 231, a clock line (CLK line) 232, a Master-In Slave-Out line (MISO line) 233, and a Master-Out Slave-In line (MOSI line) 234. It is, however, to be understood that this is merely illustrative. The host controller 210 and the secure element 220 may be connected to each other via fewer or more lines than the above-described lines.

The host controller 210 may include a first resume signal generator 211, a first resume signal recognizer 212, a first transmitter 213, a first receiver 214, a clock controller 215 and a slave select line activator 216. It is to be noted that additional elements may be added to the host controller 210 or some of the listed elements may be eliminated therefrom.

The secure element 220 may include a second resume signal generator 221, a second resume signal recognizer 222, a second transmitter 223, and a second receiver 224. It is to be noted that additional elements may be added to the secure element 220 or some of the listed elements may be eliminated therefrom.

The first resume signal generator 211 and the second resume signal generator 221 may generate resume signals. The resume signal may be a signal indicating the start of communication between the host controller 210 and the secure element 220.

The first resume signal recognizer 212 may recognize whether a signal received from the secure element 220 is a resume signal. The second resume signal recognizer 222 may recognize whether a signal received from the host controller 210 is a resume signal.

The first transmitter 213 may transmit a signal generated by the host controller 210. The second transmitter 223 may transmit a signal generated by the secure element 220.

The first receiver 214 may receive a signal transmitted from the secure element 220. The second receiver 224 may receive a signal transmitted from the host controller 210.

The clock controller 215 may generate a clock signal and provide the generated clock signal to the secure element 220 over the clock line 232. For example, the clock controller 215 may provide a clock signal to the secure element 220 over the clock line 232 with a phase locked loop (PLL) circuit, a delay locked loop (DLL), etc.

The slave select line activator 216 may activate the slave select line 231 to select the secure element 220.

For example, the slave select line activator 216 may set the slave select line 231 to a low state (logic "0") to select the secure element 220. When the slave select line 231 is set to the low state, it may be said that it is in the activated state.

As another example, the slave select line activator 216 may set the slave select line 231 to a high state (logic "1") to not select the secure element 220. When the slave select line 231 is set to the high state, it may be said that it is in the deactivated state.

According to serial peripheral interface communication schemes, data can be transmitted and received when the slave select line is activated, without using a resume signal. Because the slave select line activator is not included in the secure element 220, the secure element 220 cannot activate the slave select line 231 when the slave select line 231 is deactivated. To address such shortcoming, according to some example embodiments, the host controller 210 or the secure element 220 can generate a resume signal and transmit it.

For example, before the host controller 210 transmits first data to the secure element 220, the first resume signal generator 211 may generate a first resume signal. When the first transmitter 213 transmits the first resume signal to the secure element 220, the slave select line activator 216 may activate the slave select line 231. When the slave select line 231 is activated, the clock controller 215 may transmit a first clock signal to the secure element 220 over the clock line 232. Then, the first transmitter 213 may transmit a first signal containing the first data to the secure element 220 via the MOSI line 234.

For example, before the secure element 220 transmits third data to the host controller 210, the second resume signal generator 221 may generate a second resume signal. If the second transmitter 223 has transmitted the second resume signal to the host controller 210, the first resume signal recognizer 212 may recognize that the received signal is a resume signal. The slave select line activator 216 may activate the slave select line 231 when the first resume signal recognizer 212 recognizes the resume signal. When the slave select line 231 is activated, the clock controller 215 may transmit a first clock signal to the secure element 220 over the clock line 232. In addition, the second transmitter 223 may transmit a second signal containing third data to the host controller 210 over the MISO line 233.

Hereinafter, an example of a scheme that the host controller 210 or the secure element 220 transmits data will be described.

Figure 3:
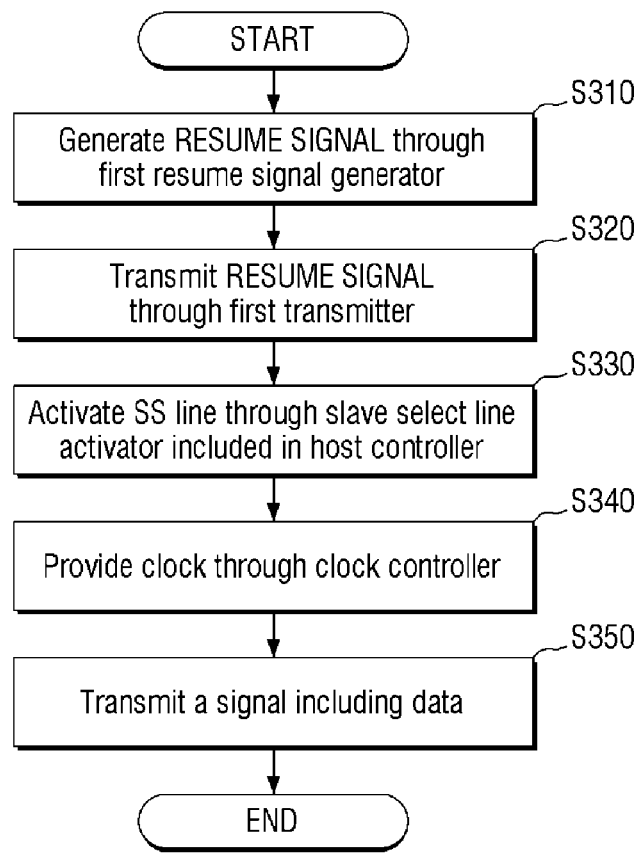
FIG. 3 is a flowchart illustrating a scheme that the host controller transmits data to the secure element in the serial peripheral interface communication system according to some example embodiments.

FIG. 3 is a flowchart illustrating a scheme that the host controller transmits data to the secure element in the serial peripheral interface communication system according to some example embodiments.

Referring to FIG. 3, prior to transmitting first data, the host controller may generate a resume signal indicating the start of communication with the secure element by the first resume signal generator (step S310). The secure element may recognize whether a signal received from the host controller is a resume signal, by the second resume signal recognizer.

For example, the second resume signal recognizer may determine that the received signal is a resume signal if the secure element receives a clock signal before the slave select line is activated.

As another example, the second resume signal recognizer may determine that the received signal is a resume signal if the secure element receives a signal containing second data irrelevant to first data via the MOSI line before the slave select line is activated.

As yet another example, the second resume signal recognizer may determine that the received signal is a resume signal if the secure element receives an activation signal via a general I/O line before the slave select line is activated.

The host controller may transmit a resume signal to the secure element by the first transmitter (step S320).

For example, if a clock signal is used as a resume signal before the slave select line is activated, the first transmitter may transmit the clock signal to the secure element over the clock line.

As another example, the first transmitter may transmit a resume signal containing the second data to the secure element via the MOSI line.

As yet another example, the first transmitter may transmit a resume signal to the secure element via a general I/O line.

After the host controller transmits the resume signal in step S320, it may activate the slave select line by the slave select line activator (step S330).

If the slave select line is activated in step S330, the host controller may provide the clock signal to the secure element by the clock controller (step S340).

The host controller may transmit the first signal including the first data to the secure element through the MOSI line while the clock signal is provided (step S350).

Figure 4:
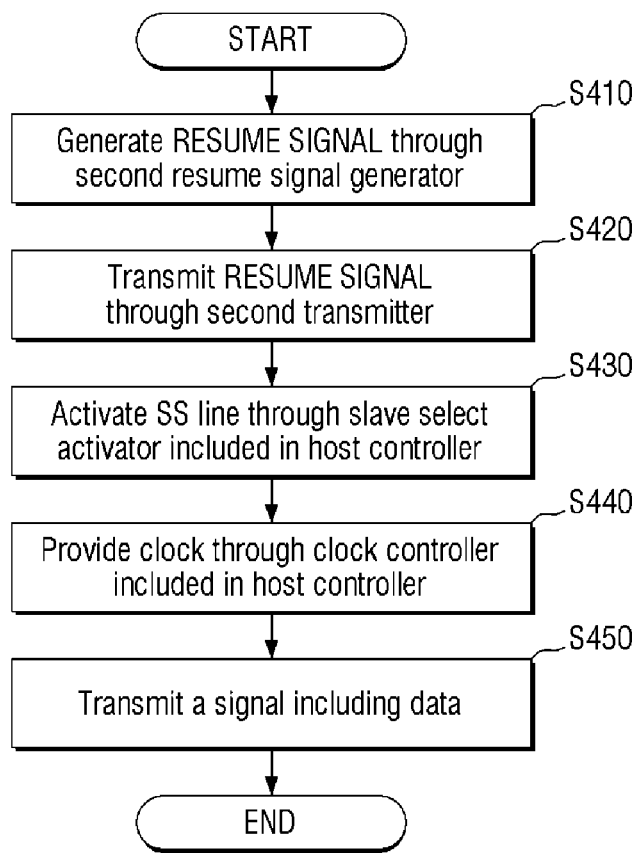
FIG. 4 is a flowchart illustrating a scheme that the secure element transmits data to the host controller in the serial peripheral interface communication system according to some example embodiments.

FIG. 4 is a flowchart illustrating a scheme that the secure element transmits data to the host controller in the serial peripheral interface communication system according to some example embodiments.

Referring to FIG. 4, before transmitting third data by the second resume signal generator, the secure element may generate a resume signal indicating the start of communication with the host controller (step S410). The host controller may recognize whether the signal received from the secure element is a resume signal, by the first resume signal recognizer included therein.

For example, the first resume signal recognizer may determine that the received signal is a resume signal if the host controller receives a signal containing fourth data irrelevant to third data over the MISO line before the slave select line is activated.

As another example, the first resume signal recognizer may determine that the received signal is a resume signal if the host controller receives an activation signal over a general-purpose I/O line before the slave select line is activated.

The secure element may transmit a resume signal to the host controller by the second transmitter (step S420).

For example, the second transmitter may transmit a resume signal containing fourth data to the secure element over the MISO line.

As yet another example, the second transmitter may transmit a resume signal to the secure element over a general-purpose I/O line.

If the host controller receives a resume signal in step S420, it may activate the slave select line by the slave select line activator (step S430).

If the slave select line is activated in step S430, the host controller may provide the clock signal to the security element by the clock controller (step S440).

The secure element may transmit the signal containing the second data to the host controller over the MISO line while the clock signal is provided (step S450).

Figure 5:
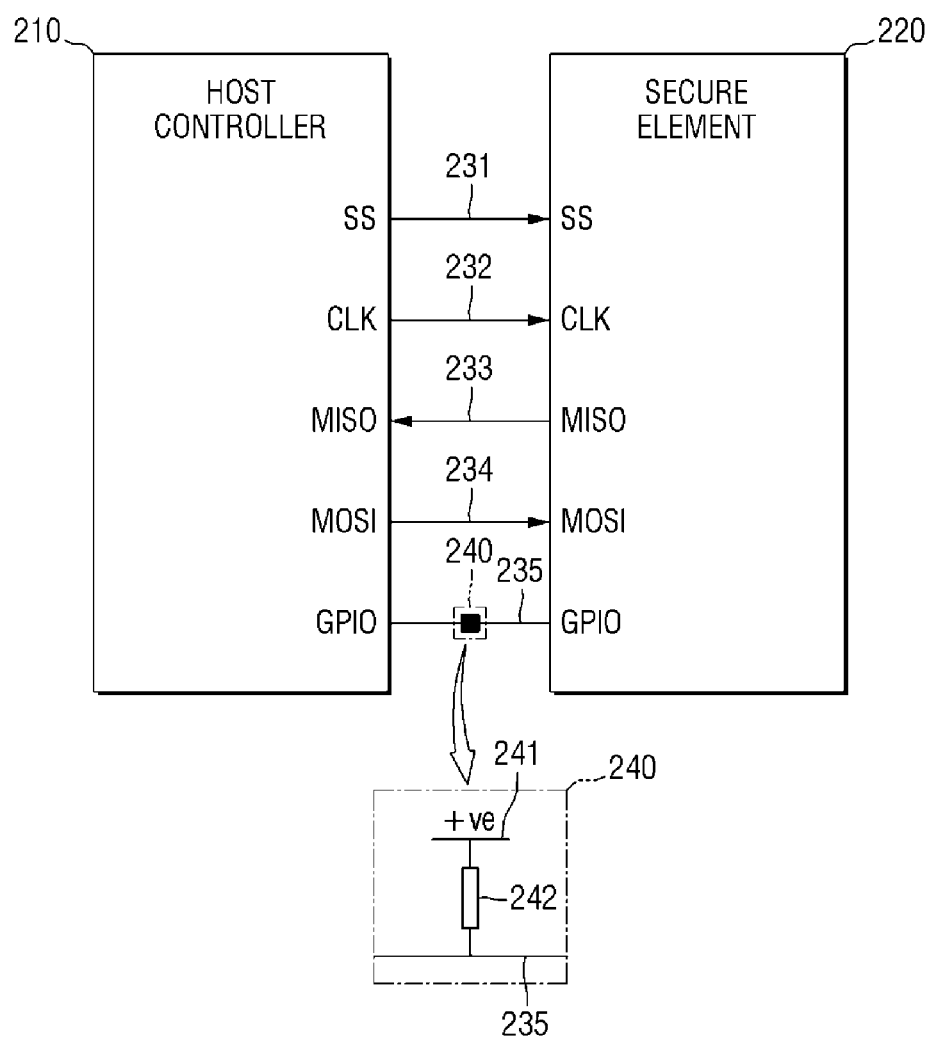
FIG. 5 is a diagram illustrating an example of a method of generating a resume signal using a general-purpose input/output (I/O) line according to some example embodiments.

FIG. 5 is a diagram illustrating an example of a method of generating a resume signal using a general-purpose I/O line according to some example embodiments.

Referring to FIG. 5, the host controller 210 and the secure element 220 may be connected to each other via SS line 231, CLK line 232, MISO line 233, and MOSI line 234.

In addition, the host controller 210 and the secure element 220 may be connected also over the general-purpose I/O line 235.

The general-purpose I/O line 235 may include a general-purpose I/O module 240. The general-purpose I/O module 240 may include a hardware pin. The general-purpose I/O module 240 may set a signal on the line to the high state (logic "1") or the low state (logic "0"). Further, the general-purpose I/O module 240 may enter an impedance state and may read the value (state) of the signal on the line.

Both the host controller 210 and the secure element 220 may control the general-purpose I/O line 235 using an open drain (or open collector) output and a pull-up resistor.

According to some example embodiments, the general-purpose I/O module 240 may include a supply rail 241 and a pull-up resistor 242.

The pull-up resistor 242 may be connected between the general-purpose I/O line 235 and the supply rail 241. The general-purpose I/O line 235 may be connected to the supply rail 241 through the pull-up resistor 242, and accordingly a logic state may be reliably transmitted to the secure element 220 connected to the general-purpose I/O line 235.

When the general-purpose I/O line 235 is activated, the pull-up resistor 242 can prevent a short circuit to ground.

When the general-purpose I/O line 235 is deactivated, the pull-up resistor 242 can form a short circuit to ground.

The state of the general-purpose I/O line 235 can be changed by the host controller 210 or the secure element 220 connected to the general-purpose I/O line 235.

The first resume signal generator included in the host controller 210 may generate the first resume signal by changing the state of the general-purpose I/O line from the low state to the high state.

The second resume signal generator included in the secure element 220 may generate the second resume signal by changing the state of the general-purpose I/O line from the low state to the high state.

Figure 6:
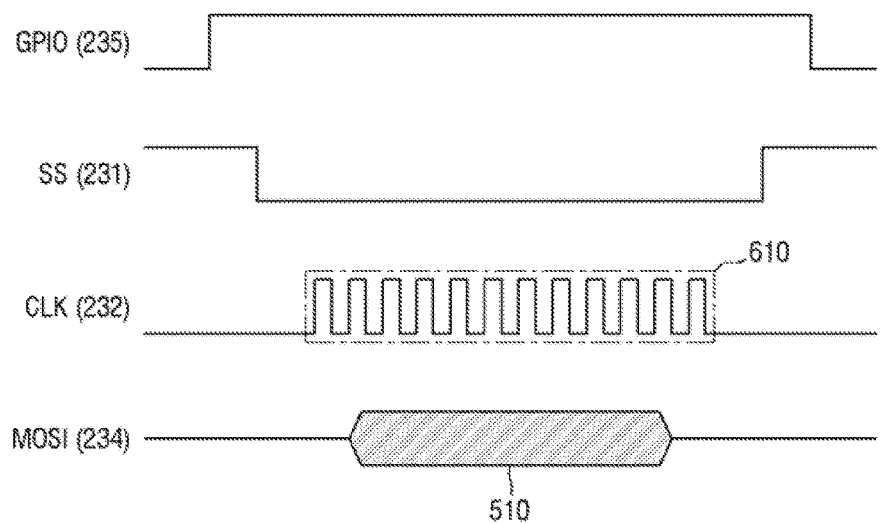
FIGS. 6 to 8 are diagram illustrating examples of schemes that the host controller transmits data to the secure element according to some example embodiments.
Figure 7:
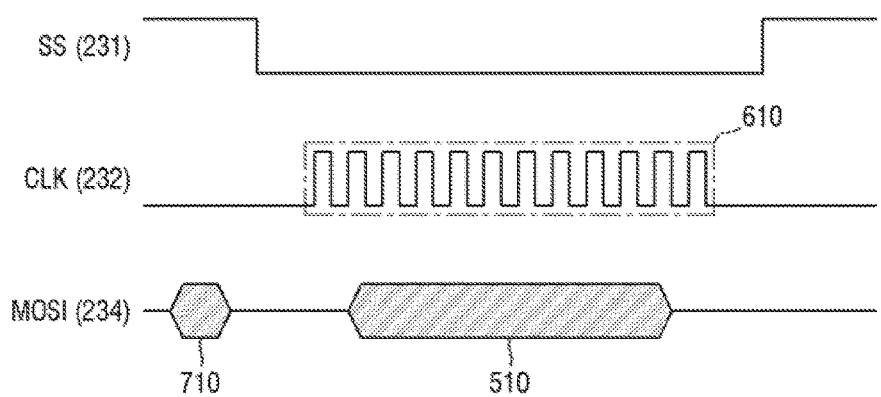
Figure 8:
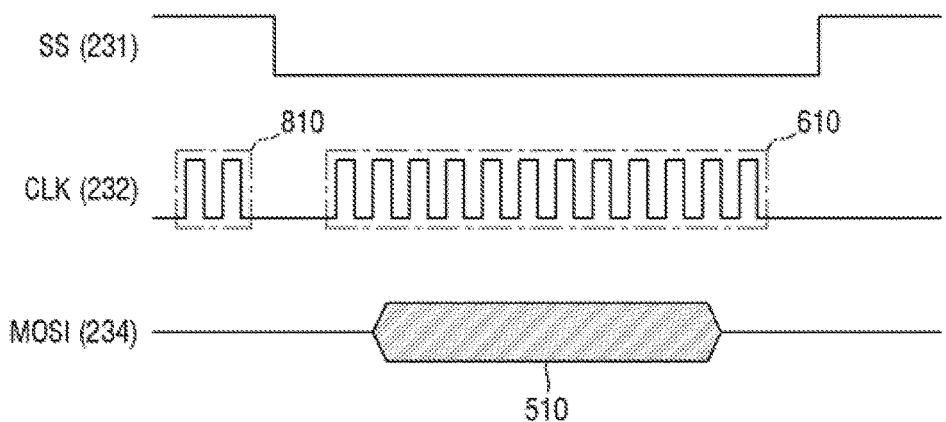

FIGS. 6 to 8 are diagrams illustrating examples of schemes that the host controller transmits data to the secure element according to some example embodiments. For brevity, descriptions will focus on differences between the above example embodiments described with reference to FIGS. 1 to 5, and the redundant description will be omitted.

Referring to FIG. 6, the host controller may change the general-purpose I/O line 235 from the low state to the high state before it transmits the first data (or the first signal 510 containing the first data) to the secure element. The second resume signal recognizer included in the secure element may recognize that the first resume signal indicating the start of communication with the host controller is received when the general-purpose I/O line 235 is changed from the low state to the high state. That is to say, the first resume signal generator included in the host controller 210 may generate the first resume signal by changing the state of the general-purpose I/O line from the low state to the high state.

After transmitting the first resume signal, the host controller may change the slave select line 231 from the high state to the low state by the slave select line activator. The slave select line 231 may be deactivated in the high state and may be activated in the low state. That is, the host controller may activate the slave select line 231 by the slave select line activator as it transmits the first resume signal.

As the slave select line 231 is activated, the host controller may transmit the first clock signal 610 to the secure element over the clock line 232.

The host controller may transmit the first signal 510 containing the first data to the secure element via the MOSI line 234 while the first clock signal 610 is transmitted to the secure element.

When the transmission of the first signal 510 is completed, the host controller may no longer provide the first clock signal 610 by the clock controller. The host controller may change the slave select line 231 from the low state to the high state by the slave select line activator. Then, the host controller may change the general-purpose I/O line from the high state to the low state.

Referring to FIG. 7, before transmitting the first data (or the first signal 510 containing the first data) to the secure element, the host controller may transmit a signal 710 containing second data which is irrelevant to the first data to the secure element via the MOSI line 234. When the second resume signal recognizer of the secure element receives the signal 710 containing the second data while the slave select line 231 is in the high state (deactivated), it may recognize that a first resume signal indicating the start of communication has been received. That is, the first resume signal generator included in the host controller may generate the first resume signal containing the second data irrelevant to the first data. It is to be noted that the second data may be dummy data.

After transmitting the first resume signal over the MOSI line 234, the host controller may change the state of the slave select line 231 from the high state to the low state by the slave select line activator. The slave select line 231 may be deactivated in the high state and may be activated in the low state. That is, the host controller may activate the slave select line 231 by the slave select line activator as it transmits the first resume signal.

As the slave select line 231 is activated, the host controller may transmit the first clock signal 610 to the secure element over the clock line 232.

The host controller may transmit the first signal 510 containing the first data to the secure element via the MOSI line 234 while the first clock signal 610 is transmitted to the secure element.

When the transmission of the first signal 510 is completed, the host controller may interrupt the first clock signal 610 by the clock controller. The host controller may change the slave select line 231 from the low state to the high state by the slave select line activator.

Referring to FIG. 8, before transmitting the first data (or the first signal 510 containing the first data) to the secure element, the host controller may transmit a second clock signal 810 different from the first clock signal 610 to the secure element over the clock line 232. When the second resume signal recognizer of the secure element receives the second clock signal 810 while the slave select line 231 is in the high state (deactivated), it may recognize that the second clock signal 810 as the first resume signal indicating the start of communication. That is, the first resume signal generator included in the host controller may generate the second clock signal 810 as the first resume signal.

After transmitting the first resume signal over the clock line 232, the host controller may change the state of the slave select line 231 from the high state to the low state by the slave select line activator. The slave select line 231 may be deactivated in the high state and may be activated in the low state. That is, the host controller may activate the slave select line 231 by the slave select line activator as it transmits the first resume signal.

As the slave select line 231 is activated, the host controller may transmit the first clock signal 610 to the secure element over the clock line 232.

The host controller may transmit the first signal 510 containing the first data to the secure element via the MOSI line 234 while the first clock signal 610 is transmitted to the secure element.

When the transmission of the first signal 510 is completed, the host controller may no longer provide the first clock signal 610 by the clock controller. The host controller may change the slave select line 231 from the low state to the high state by the slave select line activator.

Figure 9:
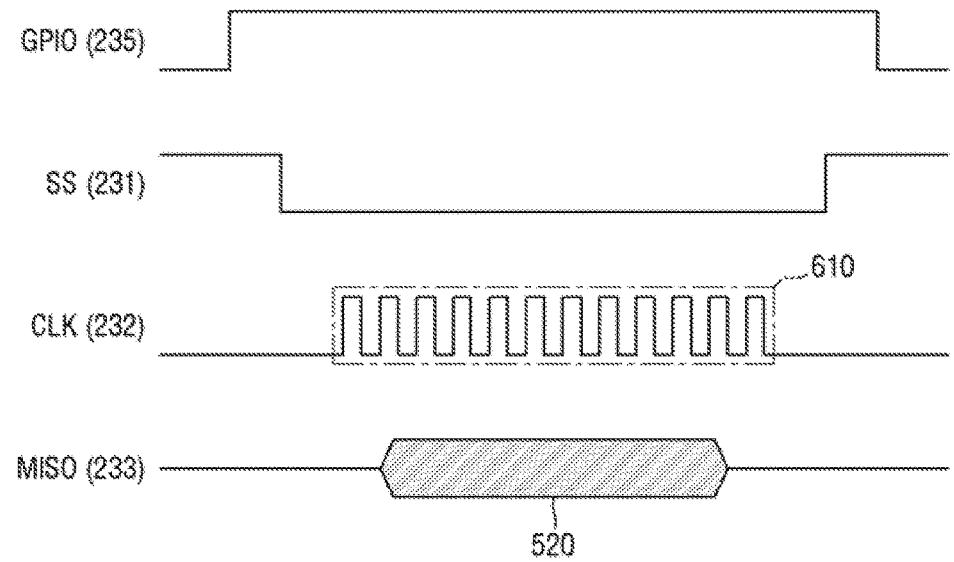
FIGS. 9 to 10 are diagrams illustrating examples of schemes that the secure element transmits data to the host controller according to some example embodiments.
Figure 10:
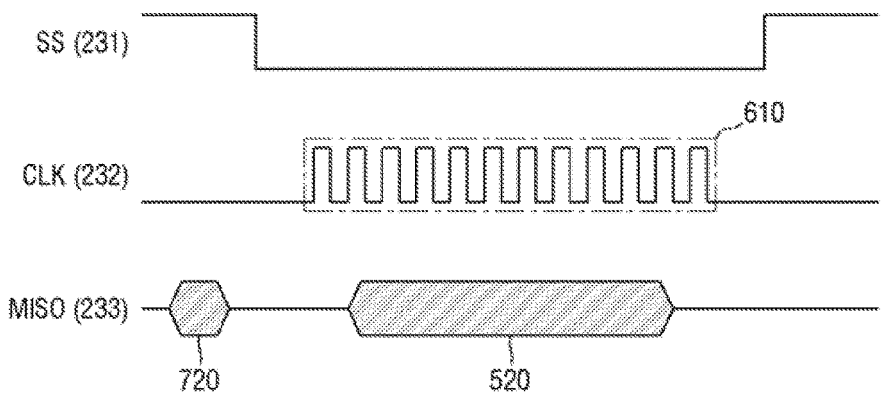

FIGS. 9 to 10 are diagrams illustrating examples of schemes that the secure element transmits data to the host controller according to some example embodiments. For brevity, descriptions will focus on differences between the above example embodiments described with reference to FIGS. 1 to 8; and the redundant description will be omitted.

Referring to FIG. 9, the secure element may change the state of the general-purpose I/O line 235 from the low state to the high state before it transmits the third data (or the second signal 520 containing the third data) to the host controller. The first resume signal recognizer included in the host controller may recognize that the second resume signal indicating the start of communication with the secure element is received when the general-purpose I/O line 235 is changed from the low state to the high state.

Upon receiving the second resume signal, the host controller may change the slave select line 231 from the high state to the low state by the slave select line activator. The slave select line 231 may be deactivated in the high state and may be activated in the low state. That is, the host controller may activate the slave select line 231 by the slave select line activator as it receives the second resume signal.

As the slave select line 231 is activated, the host controller may transmit the first clock signal 610 to the secure element over the clock line 232.

The secure element may transmit the second signal 520 containing the third data to the host controller over the MISO line 233 while the first clock signal 610 is received.

When the transmission of the second signal 520 is completed, the host controller may no longer provide the first clock signal 610 by the clock controller. The host controller may change the slave select line 231 from the low state to the high state by the slave select line activator. Then, the host controller may change the general-purpose I/O line 235 from the high state to the low state.

Referring to FIG. 10, before transmitting the third data (or the second signal 520 containing the third data) to the secure element, the host controller may transmit a signal 720 containing fourth data which is irrelevant to the third data to the secure element over the MISO line 233. When the first resume signal recognizer of the host controller receives the signal 720 containing the fourth data while the slave select line 231 is in the high state (deactivated), it may recognize that the first resume signal has been received. That is, the second resume signal generator included in the secure element may generate the fourth data irrelevant to the third data as the second resume signal.

Upon receiving the second resume signal over the MISO line 233, the host controller may change the state of the slave select line 231 from the high state to the low state by the slave select line activator. The slave select line 231 may be deactivated in the high state and may be activated in the low state. That is, the host controller may activate the slave select line 231 by the slave select line activator as it receives the second resume signal.

As the slave select line 231 is activated, the host controller may transmit the first clock signal 610 to the secure element over the clock line 232.

The secure element may transmit the second signal 520 containing the third data to the host controller over the MISO line 233 while the first clock signal 610 is received.

When the transmission of the second signal 520 is completed, the host controller may no longer provide the first clock signal 610 by the clock controller. The host controller may change the slave select line 231 from the low state to the high state by the slave select line activator.

Figure 11:
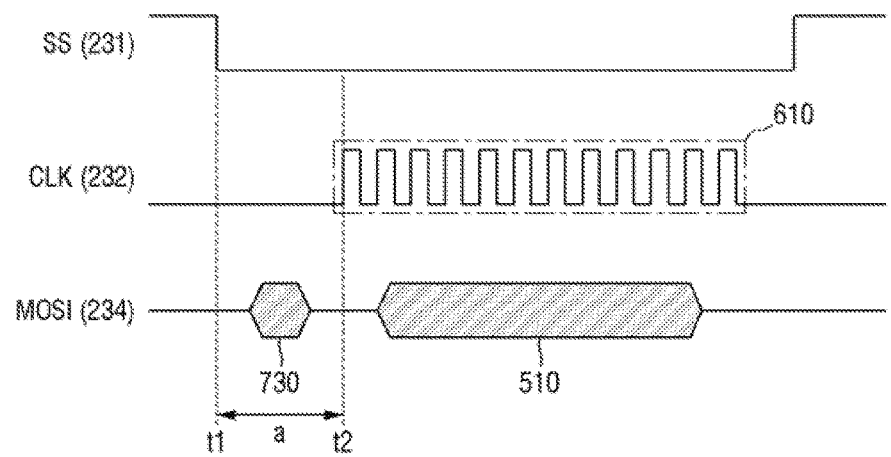
FIG. 11 is a diagram illustrating an example of a method by which the host controller, according to some example embodiments, wakes up the secure element.

FIG. 11 is a diagram illustrating an example of a method by which the host controller, according to some example embodiments, wakes up the secure element. For brevity, descriptions will focus on differences between the example embodiments described above with reference to FIGS. 1 to 10, and the redundant description will be omitted.

Referring to FIG. 11, even when the slave select line 231 is activated, the secure element may not be woken up. When this happens, the host controller may generate a signal for waking up the secure element.

For example, the host controller may generate a third resume signal 730 to wake up the secure element within time interval a: from a time t1 when the slave select line 231 is activated to a second time t2 when the first clock signal 610 starts to be transmitted. The first transmitter included in the host controller may transmit the third resume signal 730 through the MOSI line 234 in the time interval a.

When a predetermined period of time elapses because the third resume signal 730 has been transmitted to the secure element, the clock controller included in the host controller may transmit the first clock signal 610 to the secure element over the clock line 232. The first clock signal 610 is transmitted after the predetermined period of time elapsed because the third resume signal 730 has been transmitted because it takes time until the secure element wakes up.

As a result, the host controller may generate and transmit a resume signal to the secure element to wake up the secure element after the slave select line 231 has been activated.

Figure 12:
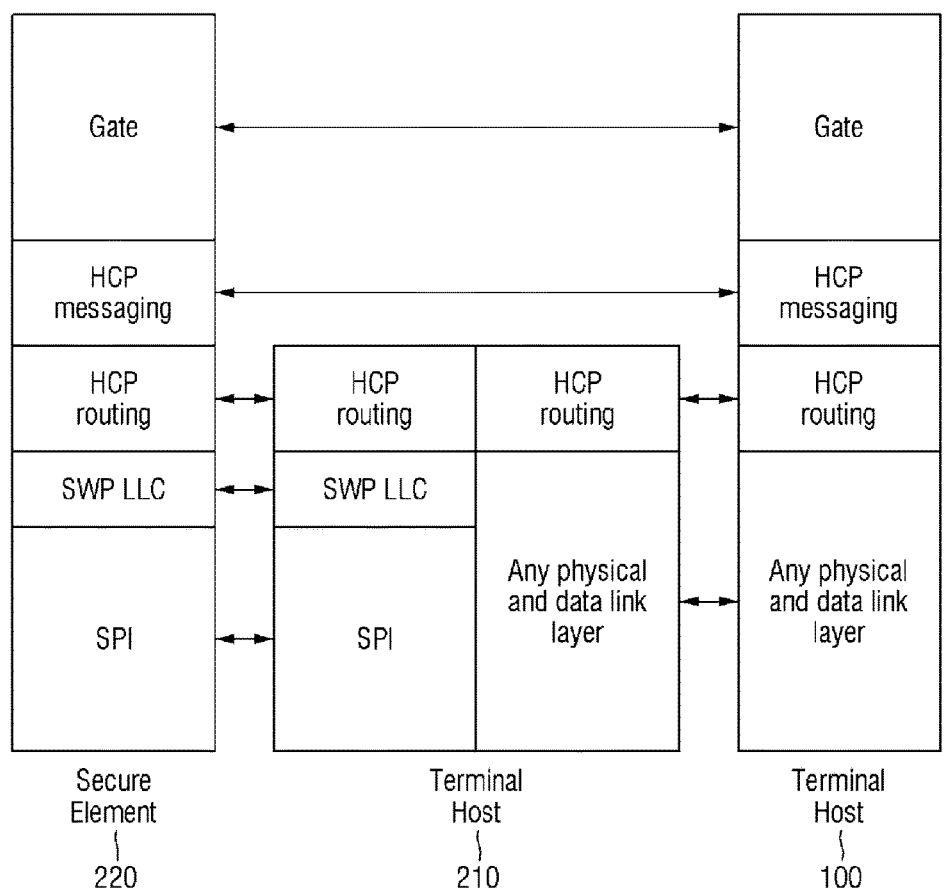
FIG. 12 is a diagram illustrating a communication layer according to some example embodiments.
Figure 13:
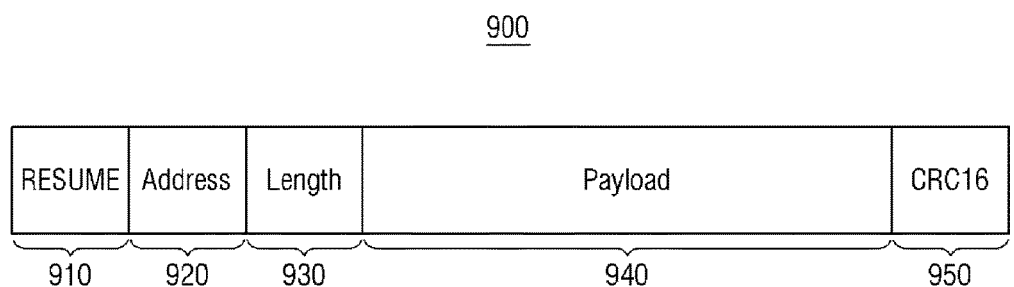
FIG. 13 is a diagram illustrating an example of the structure of a data frame used in the serial peripheral interface communication system according to some example embodiments.

FIG. 12 is a diagram illustrating a communication layer according to some example embodiments. FIG. 13 is a diagram illustrating an example of the structure of a data frame used in the serial peripheral interface communication system according to some example embodiments.

According to some example embodiments, communication between a terminal host 100, e.g., an application processor, and the secure element 220 may include a communication layer as shown in FIG. 12.

Referring to FIG. 12, the communication layer according to some example embodiments includes layers conforming to a single-wire protocol. A physical layer and a media access control (MAC) layer between the host controller 210 and the secure element 220 may be replaced with a serial peripheral interface (SPI).

By doing so, it is possible to achieve a communication speed (for example, several tens of Mbps) by using the communication layer, which the single-wire protocol cannot support. In addition, because it is not necessary to change the rest of the higher layers, minimum alteration of the operating system (OS) in the secure element is required.

It is to be noted that because the physical layer and the MAC layer among the layers conforming to the single-wire protocol have been replaced by the serial peripheral interface, the structure of the data frame used in the serial peripheral interface may be altered as shown in FIG. 13.

Referring to FIG. 13, a data frame 900 according to some example embodiments may be divided into a first data field 910, a second data field 920, a third data field 930, a fourth data field 940, and a fifth data field 950. It is, however, to be understood that this is merely illustrative. The data frame 900 may be divided into more or less number of data fields than those described above.

The first data field 910 corresponds to a resume signal indicating the start of communication. The host controller or the secure element may check the first data field 910 to determine if communication is initiated.

The second data field 920 may indicate the start of a data frame. The host controller or the secure element may check the second data field 920 to recognize the start of the frame (SOF).

The third data field 930 may indicate the length of the data frame. The host controller or the secure element may check the second data field 920 and the third data field 930 to recognize the end of the frame (EOF).

The fourth data field 940 may include data transmitted by the host controller or the secure element.

The fifth data field 950 may include error checking data that can be used to check if there is an error in the data included in the fourth data field 940. For example, data for a cyclic redundancy check may be included in the fifth data field 950.

The various operations of methods described above may be performed by any suitable means capable of performing the operations, such as various hardware and/or software component(s), circuits, and/or module(s).

The software may comprise an ordered listing of executable instructions for implementing logical functions, and can be embodied in any "processor-readable medium" for use by or in connection with an instruction execution system, apparatus, or device, such as a single or multiple-core processor or processor-containing system.

The blocks or steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

Further, those skilled in the art will appreciate that the described functional blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the scope of the present disclosure. Further, the blocks, units and/or modules of the embodiments may be physically combined into more complex blocks, units and/or modules.

Those skilled in the art will appreciate that many variations and modifications can be made without departing from the principles. Therefore, the disclosed example embodiments are used in a generic and descriptive sense only and not for purposes of limitation.

What is claimed is:

1. A host controller configured to connect to a secure element via a serial peripheral interface, the host controller comprising:
   a resume signal generator configured to generate a first resume signal indicating a start of communication with the secure element;
   a transmitter configured to transmit the first resume signal to the secure element;
   a slave select line activator configured to activate a slave select line after the first resume signal is transmitted; and
   a clock controller configured to transmit a first clock signal to the secure element over a clock line based on the slave select line being activated,
   wherein the transmitter is further configured to transmit a first signal containing first data to the secure element over a master-out slave-in line (an MOSI line) while the first clock signal is being transmitted.

2. The host controller of claim 1, wherein the resume signal generator is further configured to generate a second resume signal to wake up the secure element within a time interval from a first time when the slave select line is activated to a second time when the first clock signal is transmitted, and
   wherein the transmitter is further configured to transmit the second resume signal to the secure element over the MOSI line within the time interval.

3. The host controller of claim 2, wherein the clock controller is further configured to transmit the first clock signal to the secure element over the clock line after a predetermined period of time has elapsed since transmission of the second resume signal to the secure element.

4. The host controller of claim 1, wherein the resume signal generator is further configured to control the clock controller to generate a second clock signal different from the first clock signal as the first resume signal, and
   wherein the transmitter is further configured to transmit the first resume signal to the secure element over the clock line.

5. The host controller of claim 1, wherein the first signal comprises a first data field indicating start of the first data and a second data field indicating a length of the first data.

6. The host controller of claim 1, wherein the resume signal generator is further configured to generate the first resume signal containing second data that is irrelevant to the first data, and
   wherein the transmitter is further configured to transmit the first resume signal to the secure element over the MOSI line.

7. The host controller of claim 1, further comprising:
   a receiver configured to receive a second signal from the secure element; and
   a resume signal recognizer configured to recognize whether the second signal is a third resume signal indicating the start of communication,
   wherein the slave select line activator is further configured to activate the slave select line based on the second signal being recognized as the third resume signal, and wherein the receiver is further configured to receive a third signal comprising third data from the secure element over a master-in slave-out line (an MISO line) while the slave select line is activated and the first clock signal is transmitted over the clock line.

8. The host controller of claim 7, wherein the resume signal recognizer is further configured to recognize the second signal as the third resume signal upon receiving the second signal over the MISO line while the slave select line is deactivated.

9. A secure element configured to connect to a host controller via a serial peripheral interface, the secure element comprising:
   a resume signal generator configured to generate a first resume signal indicating a start of communication with the host controller; and
   a transmitter configured to transmit the first resume signal to the host controller, and a first signal containing first data to the host controller over a master-in slave-out line (an MISO line) while a slave select line is activated and a first clock signal is received over a clock line.

10. The secure elements of claim 9, wherein the first signal comprises a first data field indicating start of the first data and a second data field indicating a length of the first data.

11. The secure element of claim 9, wherein the resume signal generator is further configured to generate the first resume signal containing second data that is irrelevant to the first data, and
   wherein the transmitter is further configured to transmit the first resume signal to the host controller over the MISO line.

12. The secure element of claim 9, further comprising:
   a receiver configured to receive a second signal from the host controller; and
   a resume signal recognizer configured to recognize whether the second signal is a second resume signal indicating the start of communication,
   wherein the receiver is further configured to receive a third signal containing second data from the host controller over a master-out slave-in line (an MOSI line) while the first clock signal is received and the slave select line is activated.

13. The secure element of claim 12, wherein the resume signal recognizer is further configured to recognize a second clock signal as the second resume signal, the second clock signal being different from the first clock signal and being received over the clock line while the slave select line is deactivated.

14. The secure element of claim 12, wherein the resume signal recognizer is further configured to recognize a second clock signal as the second resume signal, the second clock signal containing third data different from the second data and being received over the MOSI line while the slave select line is deactivated.

15. A serial peripheral interface communication system comprising:
   a secure element; and
   a host controller connected to the secure element via a serial peripheral interface,
   wherein the host controller comprises a first resume signal generator configured to generate a first resume signal indicating a start of communication between the secure element and the host controller, and
   wherein the secure element comprises a second resume signal generator configured to generate, before second data is transmitted to the host controller, a second resume signal indicating the start of communication between the secure element and the host controller.

16. The serial peripheral interface communication system of claim 15, wherein the host controller comprises:
   a first transmitter configured to transmit the first resume signal to the secure element;
   a slave select line activator configured to activate a slave select line after the first resume signal is transmitted; and
   a clock controller configured to transmit a first clock signal to the secure element over a clock line based on the slave select line being activated,
   wherein the first transmitter is further configured to transmit a first signal containing first data to the secure element over a master-out slave-in line (an MOSI line) while the first clock signal is transmitted.

17. The serial peripheral interface communication system of claim 16, wherein the first resume signal generator is further configured to control the clock controller to generate a second clock signal different from the first clock signal as the first resume signal, and
   wherein the first transmitter is further configured to transmit the first resume signal to the secure element over the clock line.

18. The serial peripheral interface communication system of claim 16, wherein the first resume signal generator is further configured to generate the first resume signal containing third data that is irrelevant to the first data, and
   wherein the first transmitter is further configured to transmit the first resume signal to the secure element over the MOSI line.

19. The serial peripheral interface communication system of claim 15, wherein the host controller further comprises:
   a resume signal recognizer configured to recognize the second resume signal;
   a slave select line activator configured to activate a slave select line as the second resume signal is received; and
   a clock controller configured to transmit a first clock signal to the secure element over a clock line based on the slave select line being activated,
   wherein the secure element further comprises a second transmitter configured to transmit a second signal containing the second data to the host controller over a master-in slave-out line (an MISO line) while the slave select line is activated and the first clock signal is received over the clock line.

20. The serial peripheral interface communication system of claim 19, wherein the resume signal recognizer is further configured to recognize a third signal as the second resume signal, the third signal being different from the second signal and being received over the MISO line while the slave select line is deactivated.

* * * * *